March 10, 1942.    G. A. KIRKPATRICK    2,275,824
AUTOCOLLIMATING REFLECTOR
Filed July 2, 1938
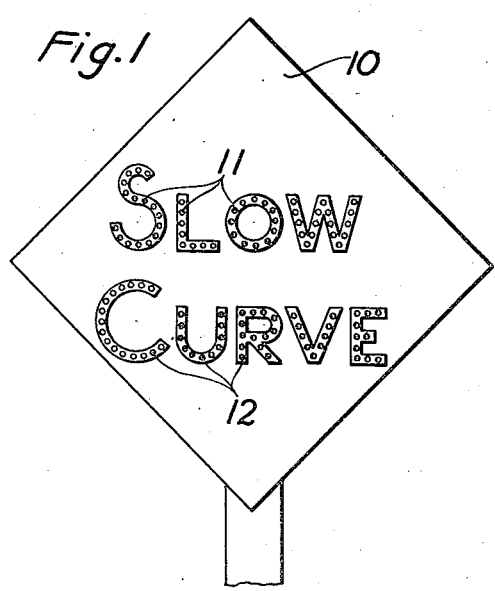
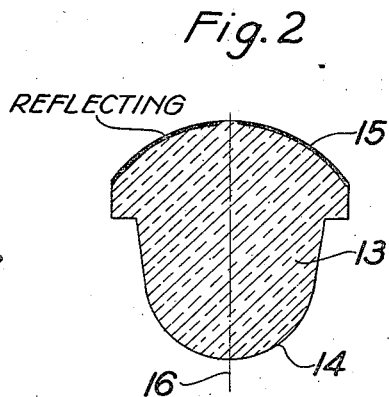
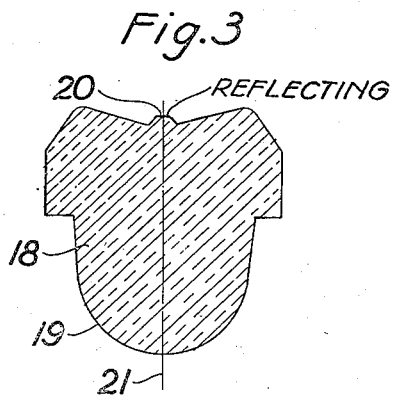
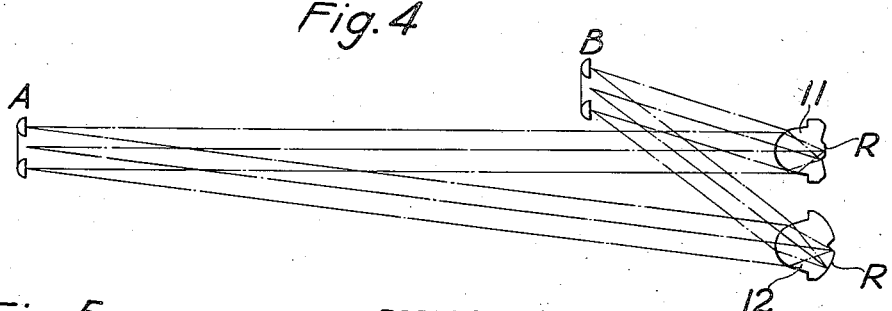
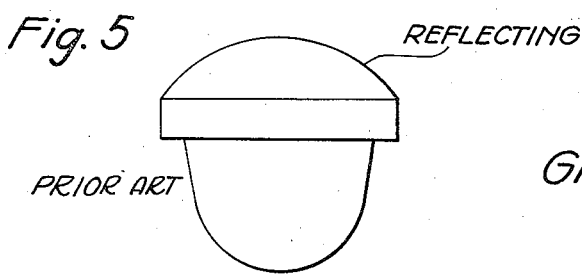
Glen A. Kirkpatrick
INVENTOR
BY
ATTORNEYS Patented Mar. 10, 1942

2,275,824

UNITED STATES PATENT OFFICE 2,275,824

AUTOCOLLIMATING REFLECTOR

Glen A. Kirkpatrick, Rochester, N. Y., assignor to Eastman Kodak Company, Rochester, N. Y., a corporation of New Jersey Application July 2, 1938, Serial No. 217,284

6 Claims. (Cl. 40—130)

This invention relates to light reflecting devices and particularly to such devices adapted to reflect light incident thereon back toward the source of the incident light.

Devices of this type are well known and are widely used in road signs, advertising signs and the like and are usually positioned so as to be illuminated by automobile headlights moving along a highway so as to be visible to the driver or occupants of such automobile.

As now employed, these reflecting devices or signs provided with the reflecting devices are arranged to face oncoming traffic so that, when first illuminated from a relatively great distance, the light is incident on them in a direction substantially parallel to their optic axes and, as the headlights approach, the angle the incident light makes with these optic axes increases until the devices are no longer autocollimating. This critical angle depends upon the construction of the devices but is ordinarily large enough for them to remain visible until the vehicle carrying the headlights is within a rod or two of the sign.

It is an object of the present invention to provide reflecting devices of the type mentioned above which are autocollimating through only a selected portion of their normal operating angle.

Another object of the invention is the provision of two or more sets of reflecting devices so constructed and arranged that they are selectively visible or invisible as the angle at which they are illuminated increases as is ordinarily the case when an automobile is approaching.

Another object of the invention is the provision of a plurality of groups of autocollimating devices of which one group is visible at great distances and at least one other group is visible only at a shorter distance i. e., when the illuminating angle is greater than a preselected value.

Other objects and advantages of the invention will become clear from the following description when read in connection with the accompanying drawing in which:

Fig. 1 shows a road sign incorporating the invention;

Fig. 2 is an outline view of one form of reflecting device made in accordance with the invention;

Fig. 3 is an outline view of another form of reflecting device according to the invention;

Fig. 4 is a schematic view showing the application of the reflectors of Figs. 2 and 3 to a highway sign; and, Fig. 5 shows an ordinary lens type reflecting button.

According to the invention, a sign such as a highway sign 10 is provided with suitable traffic control indicia such as Slow, Curve outlined by means of a plurality of autocollimating reflectors 11 and 12, respectively, which differ in visibility and also, if desired, in color. For example, with the sign 10 in place along a highway to be illuminated by an approaching automobile, the two sets of reflectors 11 and 12 are so constructed that at a great distance, say a thousand feet, the reflectors 11 alone will be visible to the driver and when the automobile approaches to a lesser distance, say five hundred feet, the reflectors 12 become visible to the driver whose attention is thereby increased and may be further increased by providing the reflectors 12 in a color different from that of the reflectors 11. In accordance with the invention the reflectors 11 may be made to be visible continuously throughout the approach or may be made to darken at any desired point such as the point at which the reflectors 12 become visible.

The reflecting units employed in the sign 10 are caused to function as above described by constructing them so that they are operative as autocollimators only for a selected limited portion of what would normally be their angular range. This may be done in any suitable manner and two specific forms are illustrated in Figs. 2 and 3.

In Fig. 2, a reflecting unit 13 is indicated having the usual front refracting surface 14 and rear reflecting surface 15 centered on an optic axis 16. In accordance with one form of the invention, a paraxial portion of the reflector is removed, destroyed, omitted or otherwise rendered ineffective so that light focused by the lens 14 in this area is not returned along its general path of incidence. The term "paraxial" is used in its ordinary sense as designating the space or area in the immediate neighborhood of the optical axis of a lens or mirror.

Anyone skilled in the art can readily make a reflecting button such as 13 to function in the manner desired, it being only necessary to take into account the lateral distance it is to be mounted from the line of travel, the angle its optic axis makes with this line of travel and the distance at which it is desired for the button 13 to become visible. If the glass employed in the button 13 has an index of refraction of 1.510, the front surface is aspherical having a focus loci which substantially coincides with the reflector 15 having a radius of curvature of 15.25 millimeters and the button 13 is to be positioned 18 feet from the line of traffic with its optic axis parallel thereto, then the paraxial portion of the reflector 15 rendered inoperative should have a diameter of approximately 1.5 millimeters in order to cause the button 13 to become visible to an approaching automobile at approximately a distance of 350 feet.

A somewhat similar reflecting button 18 is shown in Fig. 3 comprising a front refracting surface 19 and a reflector 20 centered on an optic axis 21. In this button 18, the reflector 20 occupies only the paraxial portion of the focus field of the lens surface 19. From this construction it will be evident that the button 18 functions oppositely from the button of Fig. 2 in that it returns incident light only when illuminated from a light source located quite near its optic axis. Thus when placed in the installation described above it will be visible at great distances but will darken or become invisible when the automobile approaches to a distance of approximately 350 feet.

One of the novel effects mentioned above as obtainable with the sign 10 can be realized by using for the buttons 11 buttons of the type shown in Fig. 3 for forming the word "slow" and for buttons 12 for forming the word "curve" buttons of the type shown in Fig. 2 may be employed. With the sign 10 constructed in this manner, the driver of an approaching automobile will at a great distance see only the precautionary word "slow" and when he approaches to a lesser distance, in the above example, 350 feet, the information word "curve" becomes visible and the word "slow" becomes invisible.

This sudden change in the appearance of the sign 10 revives the driver's attention and, within the purview of the invention, the change may be made even more noticeable by making the buttons 12 of a color different from that of the buttons 11.

The operation above described is schematically shown in Fig. 4. As here shown, the reflecting buttons 11 and 12 are arranged to be illuminated by headlights in positions A and B. Light from position A is incident on the buttons 11 and 12 at a very small angle with respect to their optic axes. This light will be focused on the small paraxial reflector R of button 11 and consequently will be returned to the driver at A. The light, falling on button 12, will be focused in the paraxial region not occupied by the reflector R and will not be returned to the driver at A. Obviously the situation is reversed for position B for here the light falling on button 11 will fall outside the area occupied by its reflector R and the light falling on button 12 will now strike its reflector R and be returned to the driver at B.

Various modifications are readily available and any desired combination of types of buttons may be employed. For instance, in the sign 10 one of the words, such as "slow," or some additional word or indicia may be made to be visible throughout the approach by employing ordinary full angle reflecting buttons such as the one shown in Fig. 5.

Other modifications for securing unusual effects include combinations of reflecting devices which operate as autocollimators through different and distinct or overlapping angular ranges so as to flash on and off in any desired order or sequence and with any desired color changes.

What I claim as new and desire to secure by Letters Patent of the United States is:

1. In combination, a plurality of sets of autocollimating reflectors facing the same direction and arranged with their axes substantially parallel, the reflectors of at least one set being so constructed and arranged as to reflect light back substantially along the path of the incident light only when the angle the incident light makes with the optic axes of the reflectors is greater than a predetermined angle, and the reflectors of at least one other set being so proportioned and arranged as to reflect light back substantially along the path of the incident light only when the angle the incident light makes with the optic axes of the reflectors is less than said predetermined angle.

2. In combination, a plurality of autocollimating reflecting units, each comprising a lens and a reflector positioned substantially in the image field of the lens, certain of said units having a reflector occupying a restricted portion only of the image field of its associated lens, certain other of the said units having reflectors occupying a different restricted portion of the image fields of their associated lenses, whereby as the incidence angle of the light varies said certain units will successively function as autocollimators.

3. Light reflecting means comprising a plurality of sets of autocollimating devices each comprising a lens and a reflector in collimating relation thereto, the reflectors of one set of devices being limited in area to the paraxial region of their associated lenses whereby such set of devices function as autocollimators only for light incident at less than a predetermined angle to the optical axes thereof, and the reflectors of another set of devices surrounding but not occupying the paraxial region of their associated lenses whereby such other set of devices function as autocollimators only for light incident at an angle to the optical axes thereof greater than said predetermined angle, whereby the sets are selectively visible and invisible depending upon the angle of the incident light.

4. Light reflecting means as claimed in claim 3, wherein one set of the devices absorbs light of certain wave lengths not absorbed by the other set, whereby the change in visibility of the two sets is accompanied by a change in color.

5. In a method of conveying messages by signs having a plurality of lenses and reflectors, said lenses being adapted to converge light rays so that the apex of the cone thereof will travel over the surface of an arcuate reflector, the steps of (a) moving a light source transversely of the optical axis of the lenses; (b) limiting the area of the reflectors to the center portions of the path of travel of the cone apexes; (c) limiting the area of other reflectors to the marginal portions of the path of travel of the cone apexes; and (d) so arranging said lenses and their reflectors according to their type of reflectors so as to convey different messages according to the angular position of the light source with respect to the optical axis of the lenses and their reflectors.

6. In a method of conveying messages by signs having a plurality of aspherical lenses and reflectors, said lenses being adapted to converge light rays so that the apex of the cone thereof will travel over an arcuate image field the steps of (a) providing with reflectors the center portions of the image fields of some of the lenses, leaving the marginal portions non-reflecting; (b) providing with reflectors the marginal portions of the image fields of other lenses while leaving the centers thereof non-reflecting; and (c) so arranging said lenses and their reflectors according to their type of reflectors so as to convey different messages according to the angular position of the light source with respect to the optical axis of the lenses and their reflectors.

GLEN A. KIRKPATRICK.